US012080013B2

(12) United States Patent
Tang et al.

(10) Patent No.: US 12,080,013 B2
(45) Date of Patent: Sep. 3, 2024

(54) MULTI-VIEW DEPTH ESTIMATION LEVERAGING OFFLINE STRUCTURE-FROM-MOTION

(71) Applicant: TOYOTA RESEARCH INSTITUTE, INC., Los Altos, CA (US)

(72) Inventors: Jiexiong Tang, Stockholm (SE); Rares Andrei Ambrus, San Francisco, CA (US); Sudeep Pillai, Santa Clara, CA (US); Vitor Guizilini, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 663 days.

(21) Appl. No.: 17/368,703

(22) Filed: Jul. 6, 2021

(65) Prior Publication Data

US 2022/0005217 A1 Jan. 6, 2022

Related U.S. Application Data

(60) Provisional application No. 63/048,366, filed on Jul. 6, 2020.

(51) Int. Cl.
*G06T 7/593* (2017.01)
*G06T 7/536* (2017.01)
*G06T 7/70* (2017.01)

(52) U.S. Cl.
CPC .............. *G06T 7/596* (2017.01); *G06T 7/536* (2017.01); *G06T 7/70* (2017.01); *G06T 2207/10028* (2013.01); *G06T 2207/30252* (2013.01)

(58) Field of Classification Search
CPC ........... G06T 7/596; G06T 7/536; G06T 7/70; G06T 2207/10028; G06T 2207/30252
See application file for complete search history.

(56) References Cited

U.S. PATENT DOCUMENTS

| 6,466,207 B1 * | 10/2002 | Gortler | G06T 15/205 345/422 |
| 6,487,304 B1 * | 11/2002 | Szeliski | G06T 7/246 382/167 |
| 8,355,596 B2 * | 1/2013 | Kimata | G06T 5/50 358/525 |

(Continued)

FOREIGN PATENT DOCUMENTS

CN        110728707 A      1/2020

OTHER PUBLICATIONS

Karsch et al., 2007, "DepthTransfer: Depth Extraction from video Using Non-parametric Sampling" (pp. 1-16) (Year: 2007).*

(Continued)

*Primary Examiner* — Manav Seth
(74) *Attorney, Agent, or Firm* — Seyfarth Shaw LLP

(57) ABSTRACT

A method for estimating depth of a scene includes selecting an image of the scene from a sequence of images of the scene captured via an in-vehicle sensor of a first agent. The method also includes identifying previously captured images of the scene. The method further includes selecting a set of images from the previously captured images based on each image of the set of images satisfying depth criteria. The method still further includes estimating the depth of the scene based on the selected image and the selected set of images.

20 Claims, 6 Drawing Sheets

(56) References Cited

U.S. PATENT DOCUMENTS

| | | | | |
|---|---|---|---|---|
| 8,725,273 | B2* | 5/2014 | Lenser | G06T 15/00 |
| | | | | 700/250 |
| 8,942,917 | B2 | 1/2015 | Chrysanthakopoulos | |
| 9,438,891 | B2* | 9/2016 | Mannion | H04N 13/275 |
| 9,507,995 | B2* | 11/2016 | Konolige | G06T 7/521 |
| 9,594,774 | B2* | 3/2017 | Bhardwaj | G06T 7/194 |
| 9,754,379 | B2* | 9/2017 | Ma | G06T 7/60 |
| 9,769,456 | B2* | 9/2017 | You | H04N 13/254 |
| 10,055,882 | B2* | 8/2018 | Marin | G06T 17/20 |
| 10,176,405 | B1 | 1/2019 | Zhou et al. | |
| 10,269,257 | B1* | 4/2019 | Gohl | G06T 7/20 |
| 10,380,752 | B2* | 8/2019 | Ciurea | G06T 7/557 |
| 10,630,888 | B2* | 4/2020 | Parameswaran | H04N 23/676 |
| 10,861,176 | B2* | 12/2020 | Tong | G06F 18/251 |
| 11,100,401 | B2* | 8/2021 | Godard | G06F 18/24143 |
| 11,205,278 | B2* | 12/2021 | Kang | G06T 7/194 |
| 11,425,359 | B2* | 8/2022 | Jeong | H04N 13/207 |
| 11,943,424 | B2* | 3/2024 | Oh | G06T 7/593 |
| 2010/0074532 | A1* | 3/2010 | Gordon | G06V 10/145 |
| | | | | 382/203 |
| 2012/0162379 | A1* | 6/2012 | Dahi | H04N 23/6811 |
| | | | | 348/47 |
| 2013/0016098 | A1* | 1/2013 | Addessi | G06T 19/20 |
| | | | | 345/420 |
| 2013/0070060 | A1* | 3/2013 | Chatterjee | H04N 23/45 |
| | | | | 348/47 |
| 2013/0141550 | A1* | 6/2013 | Pockett | H04N 13/30 |
| | | | | 348/51 |
| 2013/0222377 | A1 | 8/2013 | Bruls et al. | |
| 2014/0192164 | A1* | 7/2014 | Tenn | H04N 13/243 |
| | | | | 348/47 |
| 2016/0124995 | A1* | 5/2016 | Bhardwaj | G06T 7/50 |
| | | | | 382/154 |
| 2016/0267942 | A1* | 9/2016 | Fisher | G11B 27/031 |
| 2018/0075614 | A1* | 3/2018 | He | G06T 7/55 |
| 2018/0295375 | A1 | 10/2018 | Ratner | |
| 2019/0178628 | A1* | 6/2019 | Lansel | G01B 11/002 |
| 2019/0279383 | A1 | 9/2019 | Angelova et al. | |
| 2021/0026368 | A1* | 1/2021 | Cochran | G05D 1/0238 |
| 2021/0110173 | A1* | 4/2021 | Serafin | G06T 7/251 |
| 2023/0260159 | A1* | 8/2023 | Sato | G06T 7/593 |
| | | | | 382/154 |
| 2023/0410337 | A1* | 12/2023 | Pugh | G06T 7/13 |
| 2024/0127465 | A1* | 4/2024 | Madali | G03H 1/0808 |

OTHER PUBLICATIONS

Nister et al., "Visual Odometry for Ground Vehicle Application" (pp. 3-20) (Year: 2006).*

Gawel, et a., "X-View Graph-Based Semanti Multi-View Localization", IEEE Robotics and Automation Letters, vol. 3, No. 3, pp. 1687-1694, Jul. 2018.

Huang, et al., "Multi-View and Multi-Scale Localization for Intelligent Vehicles in Underground Parking Lots", Transportation Research Record Journal of the Transportation Research Board 2673(11):791-800, Nov. 2019.

Schonberger, et al., "Semantic-Visual-Localization", Computer Vision and Pattern Recognition (CVPR), Jun. 2018.

Teed, et al., "DeepV2D: Video to Depth with Differentiable Structure from Motion", ICLR, 2020.

Sarlin, et al., "From Coarse to Fine: Robust Hierarchical Localization at Large Scale", Computer Vision and Pattern Recognition (CVPR), 2019.

Tang, et al. "Self-Supervised 3D Keypoint Learning for Ego-motion Estimation" (https://arxiv.org/abs/1912.03426), Computer Vision and Pattern Recognition (CVPR), 2020.

Engel, et al., "Direct Sparse Odometry", Transactions on Pattern Analysis and Machine Intelligence, 2018.

* cited by examiner

MULTI-VIEW DEPTH ESTIMATION LEVERAGING OFFLINE STRUCTURE-FROM-MOTION

CROSS-REFERENCE TO RELATED APPLICATION

The present application claims the benefit of U.S. Provisional Patent Application No. 63/048,366, filed on Jul. 6, 2021, and titled "MULTI-VIEW DEPTH ESTIMATION LEVERAGING OFFLINE STRUCTURE-FROM-MOTION," the disclosure of which is expressly incorporated by reference in its entirety.

FIELD OF THE DISCLOSURE

Certain aspects of the present disclosure generally relate to scene reconstruction systems.

BACKGROUND

Autonomous agents (e.g., vehicles, robots, etc.) rely on machine vision for constructing a three-dimensional (3D) representation of a surrounding environment. The 3D representation may be used for various tasks, such as localization and/or autonomous navigation. The 3D representation accuracy improves the autonomous agent's ability to perform various tasks. It may be desirable to improve an accuracy of a 3D representation of an environment, where the 3D representation is constructed from one or more images captured by the autonomous agent.

SUMMARY

In one aspect of the present disclosure, a method for estimating a depth of a scene includes selecting an image of the scene from a sequence of images of the scene captured via an in-vehicle sensor of a first agent. The method further includes identifying previously captured images of the scene. The method still further includes selecting a set of images from the previously captured images based on each image of the set of images satisfying depth criteria. The method also includes estimating the depth of the scene based on the selected image and the selected set of images.

Another aspect of the present disclosure is directed to an apparatus for estimating a depth of a scene. The apparatus includes selecting an image of the scene from a sequence of images of the scene captured via an in-vehicle sensor of a first agent. The apparatus further includes identifying previously captured images of the scene. The apparatus still further includes selecting a set of images from the previously captured images based on each image of the set of images satisfying depth criteria. The apparatus also includes estimating the depth of the scene based on the selected image and the selected set of images.

In another aspect of the present disclosure, a non-transitory computer-readable medium with non-transitory program code recorded thereon for estimating a depth of a scene. The program code is executed by a processor and includes program code to select an image of the scene from a sequence of images of the scene captured via an in-vehicle sensor of a first agent. The program code further includes program code to identify previously captured images of the scene. The program code still further includes program code to select a set of images from the previously captured images based on each image of the set of images satisfying depth criteria. The program code also includes program code to estimate the depth of the scene based on the selected image and the selected set of images.

Another aspect of the present disclosure is directed to an apparatus for estimating a depth of a scene. The apparatus includes a processor; a memory coupled with the processor; and instructions stored in the memory and operable, when executed by the processor, to cause the apparatus to select an image of the scene from a sequence of images of the scene captured via an in-vehicle sensor of a first agent. Execution of the instructions further cause the apparatus to identify previously captured images of the scene. Execution of the instructions also cause the apparatus to select a set of images from the previously captured images based on each image of the set of images satisfying depth criteria. Execution of the instructions still further cause the apparatus to estimate the depth of the scene based on the selected image and the selected set of images.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
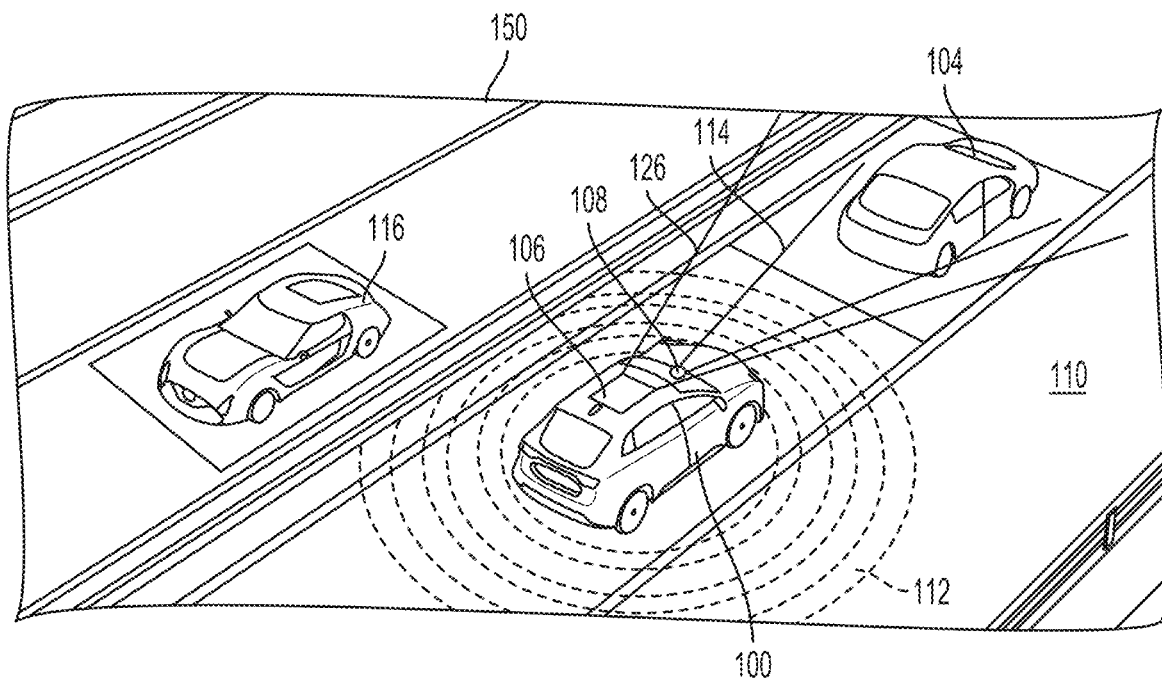
FIG. 1 illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may generate a 3D representation of an environment based on one or more images obtained from a sensor. The 3D representation may also be referred to as a 3D model, a 3D scene, or a 3D map. 3D representations may facilitate various tasks, such as scene understanding, motion planning, and/or obstacle avoidance. For example, the agent may autonomously navigate through an environment based on the 3D representation.

In some examples, the 3D representation may be generated based on one or more depth maps of an environment. Each depth map may be generated based on one or more images of the environment captured by a sensor of an agent, such as an autonomous vehicle. In some such examples, the images may be 2D images. In some examples, the depth may be estimated from recently captured images. For example, the depth may be estimated from the last k images. In such examples, some of the last k images may provide depth information, while other images of the last k images may lack depth information. In such examples, a system for generating the 3D representation may not discriminate last k images when determining depth. Therefore, an accuracy of the 3D representation may be reduced.

It may be desirable to improve an accuracy of a 3D representation to improve tasks performed by the agent, such as scene understanding, motion planning, and/or obstacle avoidance. Aspects of the present disclosure improve an accuracy of a 3D representation of a location by estimating depth from images captured by both an agent and by one or more different agents. In some examples, each agent may be a vehicle, such as an autonomous vehicle. In some implementations, the images captured by the one or more different agents may be captured at a time prior to a time when the agent is generating the 3D representation for the location. The previously captured images may be associated with a dense map generated from multiple images captured by the one or more different agents at the location.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used to generate a 3D representation of an environment.

Aspects of the present disclosure are directed to a system for constructing a 3D representation of a location from one or more images of the location captured by a sensor, such as a monocular camera. In some examples, the sensor may be integrated with an agent, such as an autonomous vehicle. In one configuration, offline structure-from-motion is leveraged for multi-view depth estimation.

As described, the 3D representation may be generated based on one or more depth maps of an environment. Each depth map may be generated based on one or more images of the environment captured by a sensor of an agent, such as an autonomous vehicle. In some such examples, the images may be 2D images.

Figure 2A:
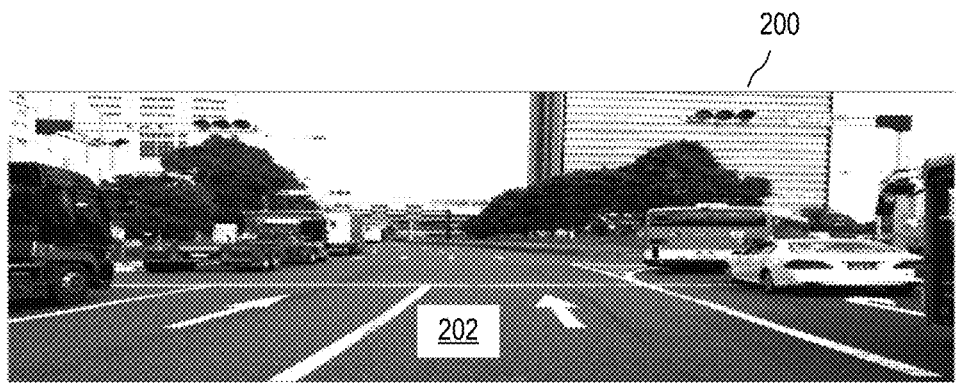
FIG. 2A is an example of a single image according to aspects of the present disclosure.

FIG. 2A illustrates an example of a target image 200 of a scene 202 according to aspects of the present disclosure. The target image 200 may be captured by a monocular camera. The monocular camera may capture a forward-facing view of an agent (e.g., a vehicle). In one configuration, the monocular camera is integrated with the vehicle. For example, the monocular camera may be defined in a roof structure, windshield, grill, or other portion of the vehicle. The vehicle may have one or more cameras and/or other types of sensors. The target image 200 may also be referred to as a current image. The target image 200 captures a 2D representation of a scene.

Figure 2B:
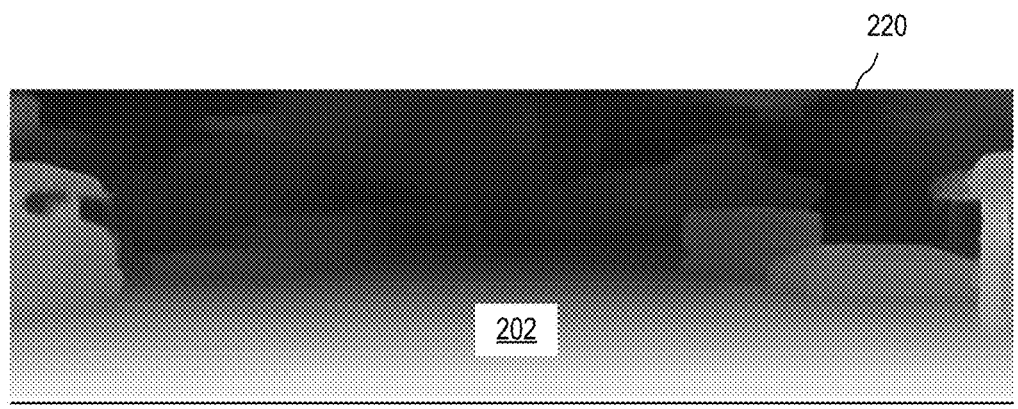
FIG. 2B is an example of a depth map according to aspects of the present disclosure.

FIG. 2B illustrates an example of a depth map 220 of the scene 202 according to aspects of the present disclosure. The depth map 220 may be estimated from the target image 200 and one or more source images. The source images may be images captured at a previous time step in relation to the target image 200. The depth map 220 provides a depth of a scene. The depth may be represented as a color or other feature.

Figure 2C:
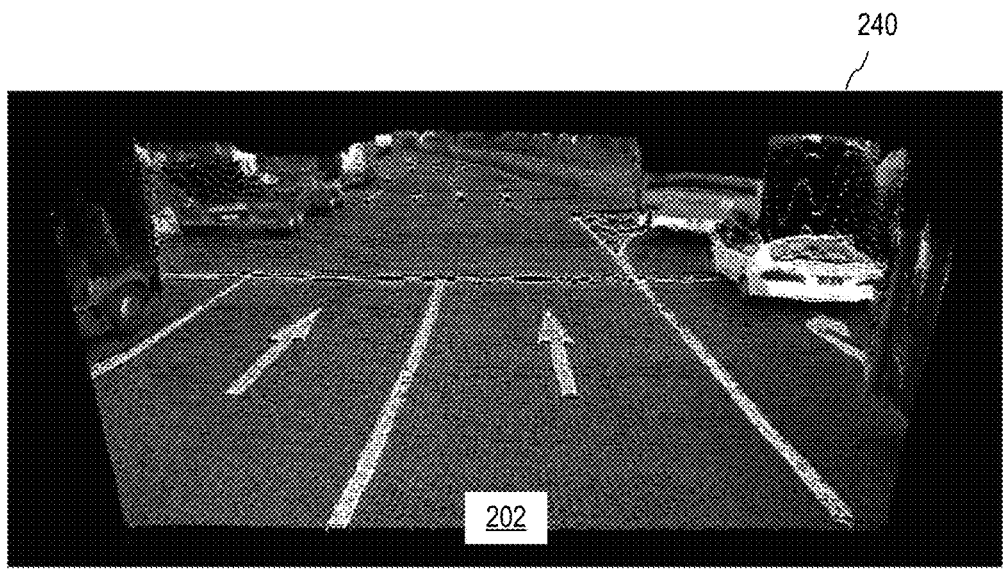
FIG. 2C is an example of a reconstructed target image according to aspects of the present disclosure.

FIG. 2C illustrates an example of a 3D reconstruction 240 of the scene 202 according to aspects of the present disclosure. The 3D reconstruction may be generated from the depth map 220 as well as a pose of the target image 200 and a source image. As shown in FIGS. 2A and 2C, the viewing angle of the scene 202 in the 3D reconstruction 240, is different from the viewing angle of the scene 202 in the target image 200. Because the 3D reconstruction 240 is a 3D view of the scene 202, the viewing angle may be changed as desired. The 3D reconstruction 240 may be used to control one or more actions of the agent.

As shown in the examples of FIGS. 2A and 2B, a depth map 220 may be generated based on a target image 200. In some examples, the depth of an image may be estimated (e.g., generated) from two or more different images. For example, the depth of an image may be estimated from the last k images. In such examples, the last k images may be captured under the same environmental conditions, such as the same lighting. Therefore, an accuracy of the 3D representation may be reduced if the last k images fail to accurately capture an environment.

It may be desirable to improve an accuracy of a 3D representation to improve tasks performed by the agent, such as scene understanding, motion planning, and/or obstacle avoidance. Aspects of the present disclosure improve an accuracy of a 3D representation of a location by estimating depth from images captured by both an agent and by one or more different agents.

In some implementations, the system for constructing the 3D representation may be a component of the agent. Additionally, or alternatively, the system for constructing the 3D representation may be a cloud device, such as a cloud-based server, or another type of device. As an example, the system may be a model (e.g., an artificial neural network) trained to generate the 3D representation. The model may be implemented via one or more specially designed processors for generating the 3D representation and/or non-transitory computer-readable medium. For ease of explanation, operations of the system may be explained in terms of operation of the agent (e.g., ego agent).

Figure 3A:
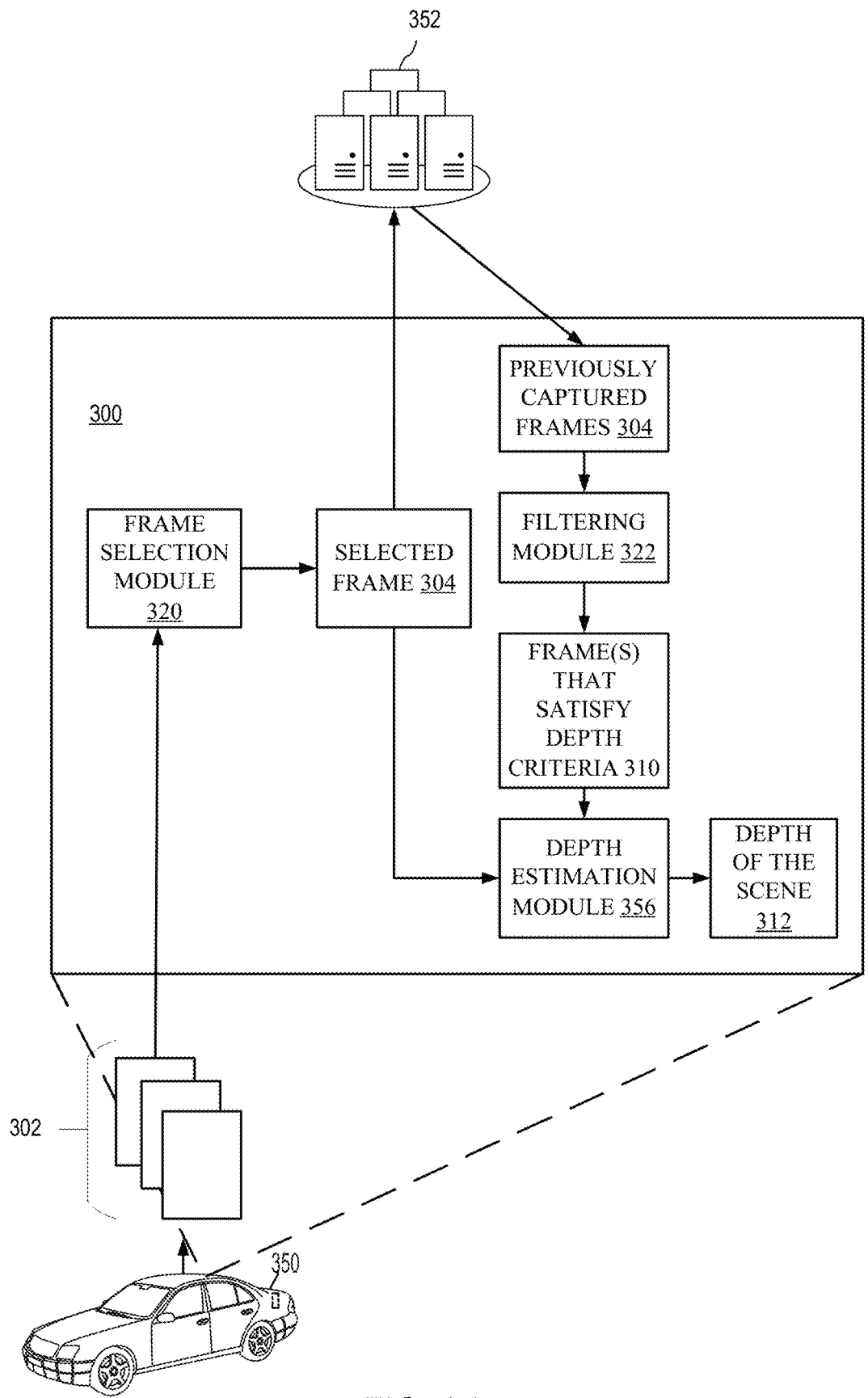
FIG. 3A illustrates an example of a depth prediction system according to aspects of the present disclosure.

FIG. 3A is a block diagram illustrating an example of a depth prediction system 300, in accordance with aspects of the present disclosure. As shown in FIG. 3A, the depth prediction system 300 of an agent 350 receives a sequence of frames 302. The agent 350 may be an example of the ego vehicle 100 described with reference to FIG. 1. The sequence of frames 302 may be frames from a video captured by a sensor of the agent 350 (not shown in FIG. 3A). In some examples, the frames may be captured as the agent 350 moves through an environment. The depth prediction system 300 may be a non-generic processor that is specified for depth prediction.

In the example of FIG. 3A, a frame selection module 320 of the depth prediction system 300 may select a frame 304 from the sequence of frames 302. In some examples, the selected frame 304 may be a keyframe. In some such examples, a depth map may be generated for the keyframe. As described, the depth map may be generated from two or more different images. In some implementations, the depth prediction system 300 transmits the selected frame 304 and/or a description of the selected frame 304 to a remote server 352. The transmission may be performed over a wireless communication channel, such as a WiFi or cellular channel. As an example, the description may include keypoint descriptors of the selected frame 304. As another example, the description of the selected frame 304 may include location information, such as location coordinates associated with the selected frame 304, and pose information of the agent 350 associated with the selected frame 304. The pose information may indicate a pose of the agent 350 when the selected frame 304 was captured.

In some implementations, the remote server 352 transmits a set of previously captured frames 308 to the agent 350 based on the selected frame 304 and/or a description of the selected frame 304. In some examples, one or more attributes of the set of previously captured frames 308 match one or more attributes of the selected frame 304 and/or a description of the selected frame 304. In some such implementations, the one or more attributes may include key points, location information, or other attributes. As an example, key points of the selected frame 304 may match key points of the set of previously captured frames 308. The set of previously captured frames 308 may be selected from a number of previously captured frames stored at the remote server 352.

In some implementations, the remote server 352 generates a dense map based on the previously captured frames stored at the remote server 352. In some examples, the dense map may be generated during an offline process. The dense map may be an example of a pre-generated map. Each frame of the previously captured frames may be captured at different times, or at a same time, from one or more agents.

In the example of FIG. 3A, a filtering module 322 of the depth prediction system 300 may filter the set of previously captured frames 308 to identify one or more frames 310 that best describe an environment for the given task. The environment refers to an environment (e.g., spatial location) associated with the selected frame 304. In the current example, the given task is depth estimation, therefore, the agent 350 may filter the set of previously captured frames 308 to identify one or more frames 310 that best describe an environment for depth estimation. That is, the filtering module 322 may filter the set of previously captured frames 308 to identify one or more frames 310 that satisfy depth criteria.

The set of previously captured frames 308 may be filtered based on entropy (or other methods) to determine a subset of previously captured frames with depth information that satisfies depth criteria. Each frame may be an example of an image. In some examples, each frame satisfies the depth criteria based on the depth information of the frame being greater than a threshold. Additionally, or alternatively, each frame satisfies the depth criteria based on the frame having a greatest amount of depth information in comparison to other frames of the set of previously captured frames 308.

In some implementations, the filtering module 322 may be a depth model trained to identify frames that satisfy depth criteria. The depth model may be an example of an artificial neural network. According to aspects of the present disclosure, filtering images to identify images that satisfy depth criteria may maximize an amount of obtainable depth information from a minimum number of images.

As shown in the example of FIG. 3A, the one or more frames 310 that satisfy depth criteria may be provided to a depth estimation module 356 to estimate the depth of the scene. In some examples, the depth estimation module 356 estimates a depth of a scene 312 based on the one or more frames 310 and the selected frame 304. In some examples, the estimated depth 312 may be for a keyframe. The keyframe may be the selected frame 304 or one of the one or more frames 310. The keyframe may be selected based on pre-defined triggers or learned triggers.

In some implementations, visual odometry methods maintain a window over a set of keyframes. A difference between each keyframe and adjacent frames in a sequence may be greater than a difference threshold. New keyframes may be added to the set of keyframes based on pre-defined triggers or learned triggers. For example, a keyframe may be added when the agent 350 has satisfied motion criteria, such as moving X distance or rotating Y degrees.

As described, the depth estimation module 356 receives a collection of frames I including the one or more frames 310 and the selected frame 304, where $I=\{I_1, I_2, \ldots, I_N\}$. The depth estimation module 356 may also receive the respective poses G corresponding to each frame $I_n$ of the collection of frame I, where $G=\{G_1, G_2, \ldots, G_N\}$. The depth estimation module 356 predicts a dense depth map D* for the keyframe. The depth estimation module 356 may be an example of an artificial neural network trained to estimate a depth based on two or more frames.

In some examples, the depth estimation module 356 builds a cost volume over learned features. In such examples, information may be aggregated over multiple viewpoints by applying a global pooling layer that pools across viewpoints. Specifically, the depth module may be viewed as the composition of a 2D feature extractor, cost volume back-projection, and 3D stereo matching.

In some implementations, the depth estimation module 356 begins by extracting learned features from the collection of frames I. The 2D encoder may include two stacked hourglass modules that map each image to a dense feature map. The cost volume back-projection selects a keyframe, such as frame $I_1$ and a cost volume is constructed for each of the remaining N−1 frames. Additionally, the 3D stereo matching processes the set of N−1 cost volumes by a series of 3D convolutional layers to perform stereo matching. View pooling may then be performed by averaging over the N−1 cost volumes to aggregate information across frames. A single volume (e.g., aggregated volume) of dimensions H×W×D×2C may be generated based on the view pooling. The aggregated volume may be then processed by a series of 3D hourglass modules, each 3D hourglass module outputs an intermediate depth estimate.

The intermediate depth estimate may be generated by applying a 1×1×1 convolution to produce an H×W×D volume. A softmax operator may be applied over the depth dimension, so that a probability distribution over depths may be obtained for each pixel. The probability volume may be mapped into a single depth estimate using a differentiable argmax function which computes the expected depth.

The process for estimating the depth of the scene may be repeated for other frames captured at different times. In some examples, the selected frame 304 may include multiple frames. In some implementations, the depth model 354 may be implemented at the remote server 352. In such implementations, the remote server 352 transmits the one or more frames 310 that satisfy depth criteria to the agent 350. In some other implementations, the remote server 352 transmits multiple frames to the agent 350 and the agent 350 selects the set of previously captured frames 308 from the multiple frames received from the remote server 352.

In another implementation, the autonomous agent estimates the depth from a keyframe selected from the sequence of frames 302. In one such implementation, the autonomous agent estimates the depth from the keyframe and one or more frames selected from the set of previously captured frames. In another such implementation, the autonomous agent estimates the depth based only on the selected keyframe.

Aspects of the present disclosure may improve the agent's 350 invariance to changes in illumination and/or viewpoint. As described, in some examples, the agent 350 may transmit a query, such as a query image, to the remote server 352, such that the agent 350 may estimate depth online (e.g., at the agent 350). The selected frame 304 may be an example of the query image. In such examples, the remote server 352 may perform a global localization search of a pre-generated map based on the query. The remote server may return a set of images 308 that are similar to the query image. In some such examples, the agent may select one or more images 310 from the set of images 308 that have a maximum correlation to the query image. In such examples, the agent 350 may estimate a depth of a current scene based on the selected frame 304 and the one or more selected images 310.

Figure 3B:
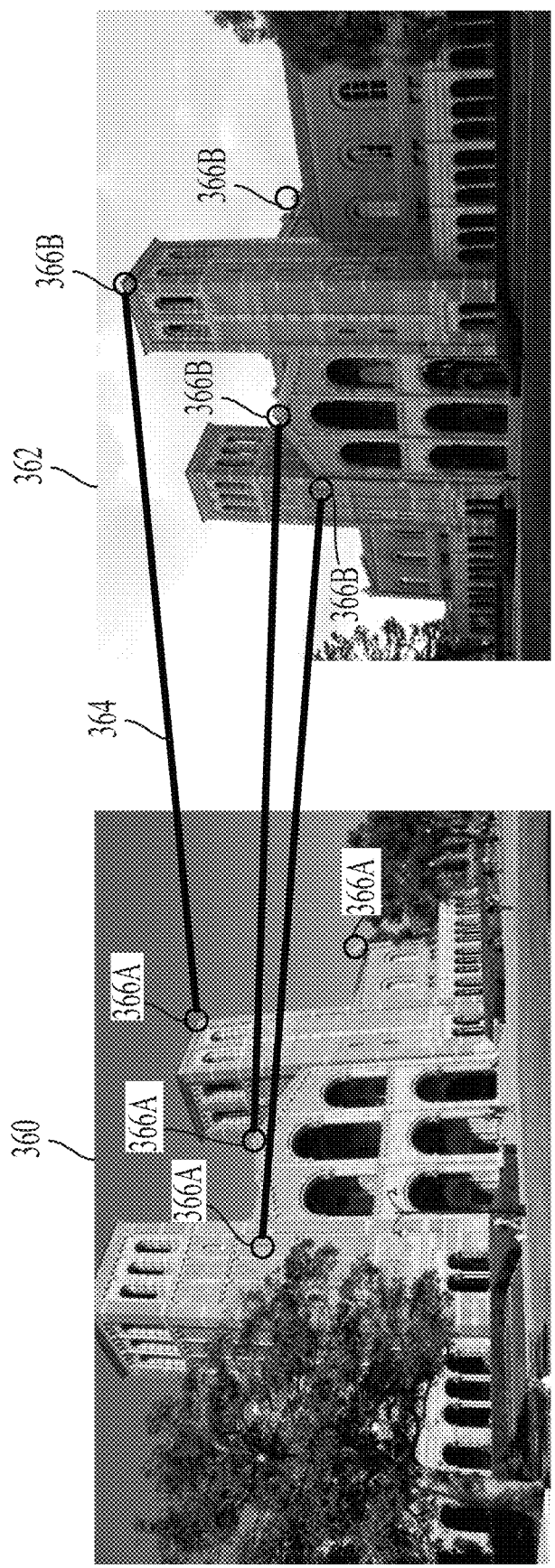
FIG. 3B is a diagram illustrating an example of matching keypoints and in a query image and a target image, in accordance with aspects of the present disclosure.

As described, the remote server 352 may perform the global localization search based on keypoints. In some examples, given a set of database images collected offline, learned keypoints and descriptors may be used to generate a globally consistent map. During online localization, the remote server 352 may obtain the matching images from the database in response to a query image. FIG. 3B is a diagram illustrating an example of matching keypoints 366A and 366B in a query image 360 and a target image 362, in accordance with aspects of the present disclosure. In the example of FIG. 3B, the query image 360 is an example of the query frame 304 described in FIG. 3A. As described, a frame is an example of an image. Additionally, in the current example, the target image 362 may be retrieved as a matching image associated with the query image 360 based on a number of keypoints 366A in the query image 360 that match keypoints 366B of the target image 362. In some examples, the target image 362 may be retrieved from a storage system, such as a memory device of the agent or a cloud-based storage system based on the number of keypoints 366A in the query image 360. The query image 360 may be unknown to the agent at a time when the image 360 is captured by a sensor of the agent.

In some examples, a distance between a location corresponding to the query image 360 and a location corresponding to the target image 362 satisfies a distance condition. For example, the distance may satisfy the distance condition when the distance between the location of the query image 360 and the location of the target image 362 is less than a distance threshold, such that the images 360 and 362 are acquired in a same environment.

As described, in some implementations, the query image 360 may be used for a search an image database. The search may be an example of a visual search of the image database. In some examples, the images in the image database may be geotagged. Additionally, in some examples, the images of the database may include images of a sparse 3D model. That is, a sparse 3D model of an environment may be generated from two or more images stored in the image database.

In such implementations, locations of top-ranked images selected from the image database may be used as suggestions for a location of the query image 360. In some examples, an image extraction function produces a fixed size vector $f(I_i)$ given a frame $I_i$, such as the query image 360. Specifically, the image extraction function may extract representations for the entire image database offline. At test time, the visual search is performed by finding a nearest database image to the query image 360 based on matching keypoints. In some examples, the image extraction function, or another module, may also extract features (e.g., keypoints) of the query image 360. The keypoints of the query image 360 may be matched with keypoints of one or more images in the image database. In one configuration, the keypoints may be matched on a global scale and then a local scale. Additionally, the keypoints may be directly matched. In some implementations, the nearest database image may be found via a nearest neighbor search, by sorting images based on a Euclidean distance between an image of the database and the query image 360. In the example of FIG. 3B, the target image 362 may be the nearest database image to the query image 360.

In some implementations, a map of an agent's surrounding environment may be generated based on a depth estimate generated from the target image 362 and the query image 360. In some examples, a six degree of freedom (6-DoF) pose of the sensor may be estimated from the matching keypoints. Additionally, or alternatively, in some examples, a sparse 3D representation, such as a 3D map, of the agent's surrounding environment may be generated based on the depth estimate. The pre-built map may be stored in a memory of the agent and/or stored in a remote memory location, such as a cloud memory storage location. The 3D maps may be used for localization and navigation.

As shown in FIG. 3B, matching keypoints 366A and 366B between the query image 360 and the target image 362 are depicted using connector lines 364 between corresponding features. Connector lines 364 may connect a center of receptive fields for matching keypoints 366A and 366B. Each keypoint 366A and 366B may correspond to a feature of an image 360 and 362. Thus, in some examples, a keypoint may be referred to as a feature. Additionally, as shown in FIG. 3B, due to an angle of a sensor used for capturing an image, occlusion, and/or other factors, one or more keypoints 366A and 366B may not match. Additionally, in some implementations, each keypoint 366A and 366B may correspond with a respective descriptor. Each keypoint respective descriptor may be a string determined based on features of the image obtained from an encoding process of a keypoint model, such as a keypoint framework described with reference to FIG. 3B.

In the example of FIG. 3B, the connector lines 364 are provided for illustrative purposes. A number of connector lines 364 may correspond to a number of matching keypoints. In some examples, during testing (e.g., real-world deployment), the connector lines 364 may not be generated between matched images 360 and 362.

According to aspects of the present disclosure, a depth estimation system of the agent may be trained to estimate depth based on the query image 360 and a set of database images received from a remote server. The depth may be estimated based on multi-view stereo matching. In some implementations, offline map information may be leveraged to perform online depth estimation, thereby improving contextual information.

Figure 4:
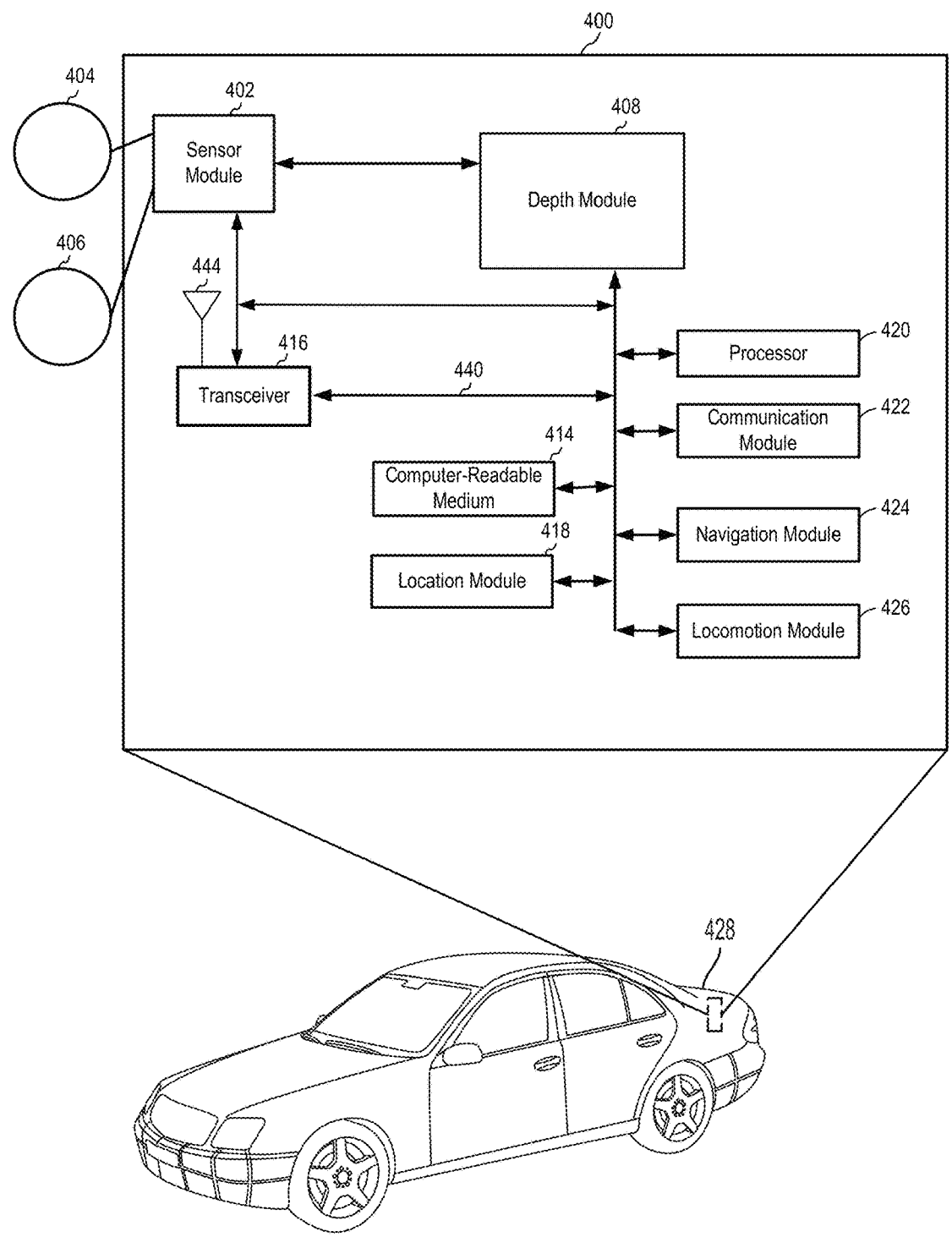
FIG. 4 is a diagram illustrating an example of a hardware implementation for a depth estimation system, in accordance with aspects of the present disclosure.

FIG. 4 is a diagram illustrating an example of a hardware implementation for a depth estimation system 400, according to aspects of the present disclosure. The depth estimation system 400 may be a component of a vehicle, a robotic device, or another device. For example, as shown in FIG. 4, the depth estimation system 400 is a component of a vehicle 428. The vehicle 428 may be an example of an ego vehicle 100 and an agent 350 described with reference to FIGS. 1 and 3A, respectively. Aspects of the present disclosure are not limited to the depth estimation system 400 being a component of the vehicle 428, as other types of agents, such as a bus, boat, drone, or robot, are also contemplated for using the depth estimation system 400.

The vehicle 428 may operate in one or more of an autonomous operating mode, a semi-autonomous operating mode, and a manual operating mode. Furthermore, the vehicle 428 may be an electric vehicle, a hybrid vehicle, a fuel vehicle, or another type of vehicle.

The depth estimation system 400 may be implemented with a bus architecture, represented generally by a bus 440. The bus 440 may include any number of interconnecting buses and bridges depending on the specific application of the depth estimation system 400 and the overall design constraints. The bus 440 links together various circuits including one or more processors and/or hardware modules, represented by a processor 420, a communication module 422, a location module 418, a sensor module 402, a locomotion module 426, a navigation module 424, and a computer-readable medium 414. The bus 440 may also link various other circuits such as timing sources, peripherals, voltage regulators, and power management circuits, which are well known in the art, and therefore, will not be described any further.

The depth estimation system 400 includes a transceiver 416 coupled to the processor 420, the sensor module 402, a depth estimation module 408, the communication module 422, the location module 418, the locomotion module 426, the navigation module 424, and the computer-readable medium 414. The transceiver 416 is coupled to an antenna 444. The transceiver 416 communicates with various other devices over one or more communication networks, such as an infrastructure network, a V2V network, a V2I network, a V2X network, a V2P network, or another type of network. As an example, the transceiver 416 may transmit a warning to other agents when a depth estimation module 408 determines that an occluded area is occluding high risk information.

The depth estimation system 400 includes the processor 420 coupled to the computer-readable medium 414. The processor 420 performs processing, including the execution of software stored on the computer-readable medium 414 providing functionality according to the disclosure. The software, when executed by the processor 420, causes the depth estimation system 400 to perform the various functions described for a particular device, such as the vehicle 428, or any of the modules 402, 408, 414, 414, 418, 420, 422, 424, 424. The computer-readable medium 414 may also be used for storing data that is manipulated by the processor 420 when executing the software.

The sensor module 402 may be used to obtain measurements via different sensors, such as a first sensor 404 and a second sensor 406. The first sensor 404 may be a vision sensor, such as a stereoscopic camera or a red-green-blue (RGB) camera, for capturing 2D images. The second sensor 406 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 404.

The measurements of the first sensor 404 and the second sensor 406 may be processed by one or more of the processor 420, the sensor module 402, the depth estimation module 408, the communication module 422, the location module 418, the locomotion module 426, the navigation module 424, in conjunction with the computer-readable medium 414 to implement the functionality described herein. In one configuration, the data captured by the first sensor 404 and the second sensor 406 may be transmitted to an external device via the transceiver 416. The first sensor 404 and the second sensor 406 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the depth estimation system 400.

The locomotion module 426 may be used to facilitate locomotion of the vehicle 428. As an example, the locomotion module 426 may control a movement of the wheels. As another example, the locomotion module 426 may be in communication with one or more power sources of the vehicle 428, such as a motor and/or batteries. Of course, aspects of the present disclosure are not limited to providing locomotion via wheels and are contemplated for other types of components for providing locomotion, such as propellers, treads, fins, and/or jet engines.

The depth estimation system 400 also includes the navigation module 424 for planning a route or controlling the locomotion of the vehicle 428, via the locomotion module 426. The navigation module 424 may override user input when the user input is expected (e.g., predicted) to cause a collision. The modules may be software modules running in the processor 420, resident/stored in the computer-readable medium 414, one or more hardware modules coupled to the processor 420, or some combination thereof.

The depth estimation module 408 may be in communication with and/or work in conjunction with one or more of the sensor module 402, the transceiver 416, the processor 420, the communication module 422, the location module 418, the locomotion module 426, the navigation module 424, and the computer-readable medium 414. The depth estimation module 408 may be configured to select an image of the scene from a sequence of images of the scene captured via an in-vehicle sensor (e.g., the first sensor 404 and/or the second sensor 406) of the vehicle 428. The selected image may comprises a keyframe. The image may be selected based on a pre-defined trigger or a learned trigger.

The depth estimation module 408 may also be configured to identify a number of previously captured images of the scene. The images may be captured by one or more different agents different from the vehicle 428. One or more of characteristics of the number of previously captured images are different from characteristics of the image of the scene selected from a sequence of images of the scene captured via an in-vehicle sensor of the vehicle 428. The characteristics comprises at least pose and lighting. The previously captured images may be stored at a remote server.

The depth estimation module 408 may further be configured to select a set of images from the number of images based on the set of images satisfying depth criteria. As an examples, the set of images may satisfy the depth criteria based on an amount of depth information for each image in the set of images is greater than a threshold. Additionally, or alternatively, the set of images may have a maximum correlation with the image of the scene. The depth estimation module 408 may include a depth model trained to select the set of images.

The depth estimation module 408 may additionally be configured to estimate the depth of the scene based on the selected image and the selected set of images. That is, the depth estimation module 408 may be trained for multi-view depth estimation. An action of the vehicle 428 may be controlled based on the estimated depth.

Figure 5:
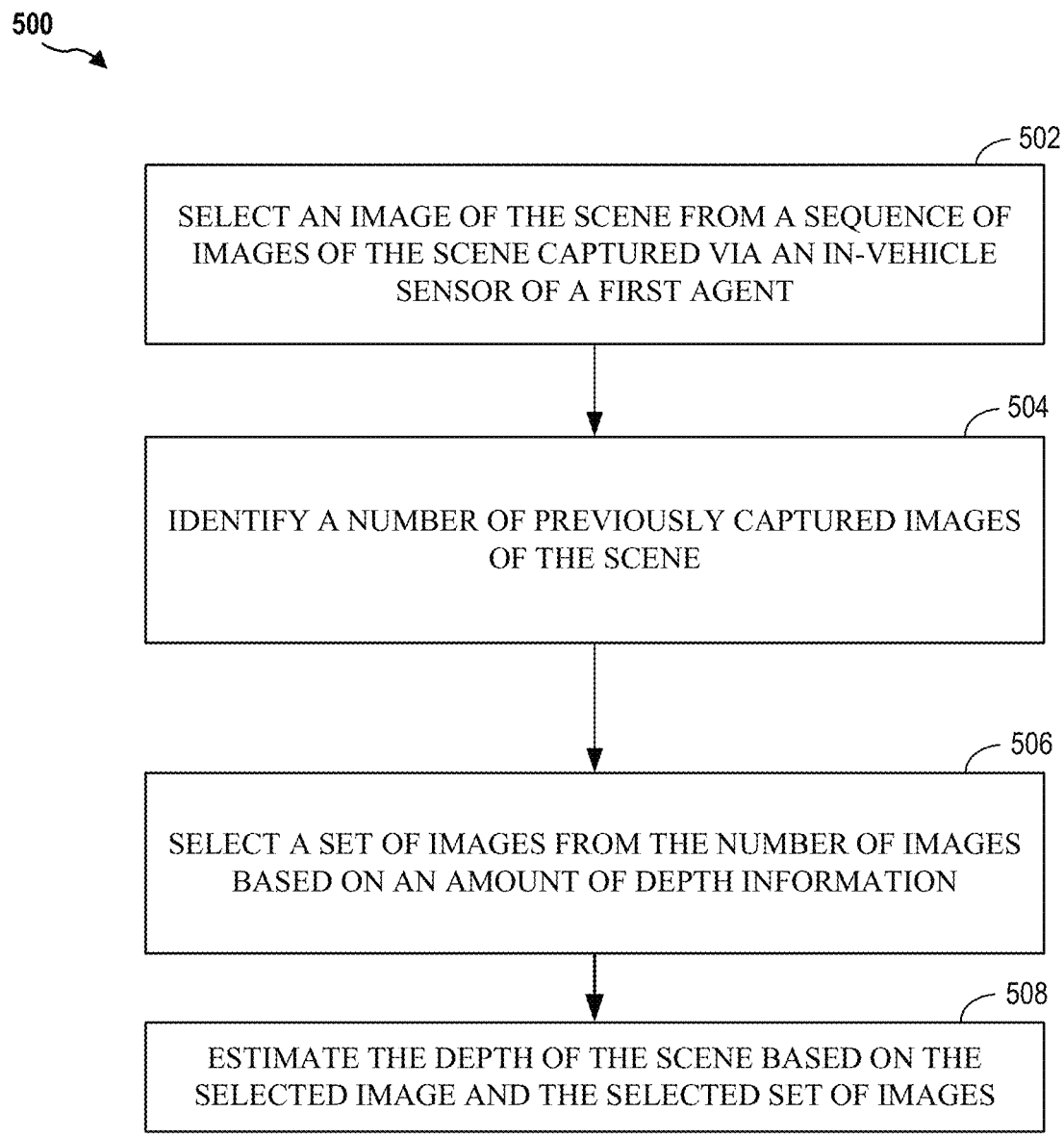
FIG. 5 illustrates a flow diagram for a process, in accordance with aspects of the present disclosure.

FIG. 5 illustrates a flow diagram for a process 500 in accordance with aspects of the present disclosure. The process 500 may be executed by a vehicle, such as an ego vehicle 100, an agent 350, and/or the depth estimation module 408, as described with reference to FIGS. 1, 3 and 4, respectively. As shown in FIG. 5, at block 502, the process 500 selects an image of the scene from a sequence of images of the scene captured via an in-vehicle sensor (e.g., the first sensor 404 and/or the second sensor 406) of a first agent. The selected image may comprises a keyframe. The image may be selected based on a pre-defined trigger or a learned trigger.

The process 500 may also identify a number of previously captured images of the scene (block 504). The images may be captured by one or more different agents different from the first agent. One or more of characteristics of the number of previously captured images are different from characteristics of the image of the scene selected from a sequence of images of the scene captured via an in-vehicle sensor of the first agent. The characteristics comprises at least pose and lighting. The previously captured images may be stored at a remote server.

The process 500 may also select a set of images from the number of images based on the set of images satisfying depth criteria (block 506). The set of images may be selected when the amount of depth information for each image in the set of images is greater than a threshold The process 500 may further estimate the depth of the scene based on the selected image and the selected set of images (block 508). An action of the vehicle 428 may be controlled based on the estimated depth. As an example, the vehicle 428 may be controlled to avoid an object, such as a pedestrian or an inanimate object on the road.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for estimating depth of a scene:
selecting an image of the scene from a sequence of images of the scene captured via an in-vehicle sensor of a first agent;
identifying a plurality of previously captured images of the scene;
selecting a set of images from the plurality of previously captured images based on each image of the set of images satisfying depth criteria; and
estimating the depth of the scene based on the selected image and the selected set of images.

2. The method of claim 1, wherein the plurality of previously captured images are captured by one or more second agents different from the first agent.

3. The method of claim 1, wherein one or more of characteristics of the plurality of previously captured images are different from characteristics of the selected image of the scene.

4. The method of claim 3, wherein the characteristics comprises at least pose and lighting.

5. The method of claim 1, further comprising selecting the set of images when the amount of depth information for each image in the set of images is greater than a threshold.

6. The method of claim 1, wherein the plurality of previously captured images are stored at a remote server.

7. The method of claim 1, further comprising selecting the image based on a pre-defined trigger or a learned trigger.

8. The method of claim 1, wherein the selected image comprises a keyframe.

9. The method of claim 1, further comprising controlling an action of the first agent based on the estimated depth.

10. An apparatus for estimating depth of a scene:
a processor;
a memory coupled with the processor; and
instructions stored in the memory and operable, when executed by the processor, to cause the apparatus to:
select an image of the scene from a sequence of images of the scene captured via an in-vehicle sensor of a first agent;
identify a plurality of previously captured images of the scene;
select a set of images from the plurality of previously captured images based on each image of the set of images satisfying depth criteria; and
estimate the depth of the scene based on the selected image and the selected set of images.

11. The apparatus of claim 10, wherein the plurality of previously captured images are captured by one or more second agents different from the first agent.

12. The apparatus of claim 10, wherein one or more of characteristics of the plurality of previously captured images are different from characteristics of the selected image of the scene.

13. The apparatus of claim 12, wherein the characteristics comprises at least pose and lighting.

14. The apparatus of claim 10, wherein execution of the instructions further cause the apparatus to select the set of images when the amount of depth information for each image in the set of images is greater than a threshold.

15. The apparatus of claim 10, wherein the plurality of previously captured images are stored at a remote server.

16. The apparatus of claim 10, wherein execution of the instructions further cause the apparatus to select the image based on a pre-defined trigger or a learned trigger.

17. The apparatus of claim 10, wherein the selected image comprises a keyframe.

18. The apparatus of claim 10, wherein execution of the instructions further cause the apparatus to control an action of the first agent based on the estimated depth.

19. A non-transitory computer-readable medium having program code recorded thereon for estimating depth of a scene, the program code executed by a processor and comprising
program code to select an image of the scene from a sequence of images of the scene captured via an in-vehicle sensor of a first agent;
program code to identify a plurality of previously captured images of the scene;
program code to select a set of images from the plurality of previously captured images based on each image of the set of images satisfying depth criteria; and
program code to estimate the depth of the scene based on the selected image and the selected set of images.

20. The non-transitory computer-readable medium of claim 19, wherein:
the plurality of previously captured images are captured by one or more second agents different from the first agent; and
one or more of characteristics of the plurality of previously captured images are different from characteristics of the selected image of the scene.

* * * * *